United States Patent

Burnett

[15] 3,647,030
[45] Mar. 7, 1972

[54] SPRING-APPLIED DISC BRAKE
[72] Inventor: Richard T. Burnett, South Bend, Ind.
[73] Assignee: The Bendix Corporation
[22] Filed: May 18, 1970
[21] Appl. No.: 38,088

[52] U.S. Cl...........................188/72.3, 188/71.9, 188/170, 188/196 D
[51] Int. Cl....................................F16d 55/14, F16d 65/24
[58] Field of Search....................188/71.9, 72.3, 170, 196 D

[56] References Cited

UNITED STATES PATENTS

| | | | |
|---|---|---|---|
| 3,033,325 | 5/1962 | Tjernstrom | 188/170 |
| 3,114,436 | 12/1963 | Larson | 188/72.3 |
| 3,547,233 | 12/1970 | Girvan | 188/72.3 X |

Primary Examiner—Duane A. Reger
Attorney—W. N. Antonis and Plante, Hartz, Smith & Thompson

[57] ABSTRACT

A disc brake is disclosed which has a spring actuator in addition to the usual hydraulic actuation. When the brake is functioning normally, fluid pressure opposes the spring actuator to permit normal hydraulic operation of the brake. However, when fluid pressure is not available to the brake, because of a malfunction or because the vehicle operator has closed a valve to isolate the brakes from the vehicle's hydraulic system, the spring actuator maintains the frictional elements engaged with the rotor. The spring actuator, therefore, functions as both a parking brake and a fail-safe brake that immobilizes the vehicle when a malfunction in the vehicle's hydraulic system occurs. Mechanical release means are provided to release the spring actuator to permit the vehicle to be moved if the spring actuator has applied the brake while the vehicle is standing in an inconvenient location.

7 Claims, 2 Drawing Figures

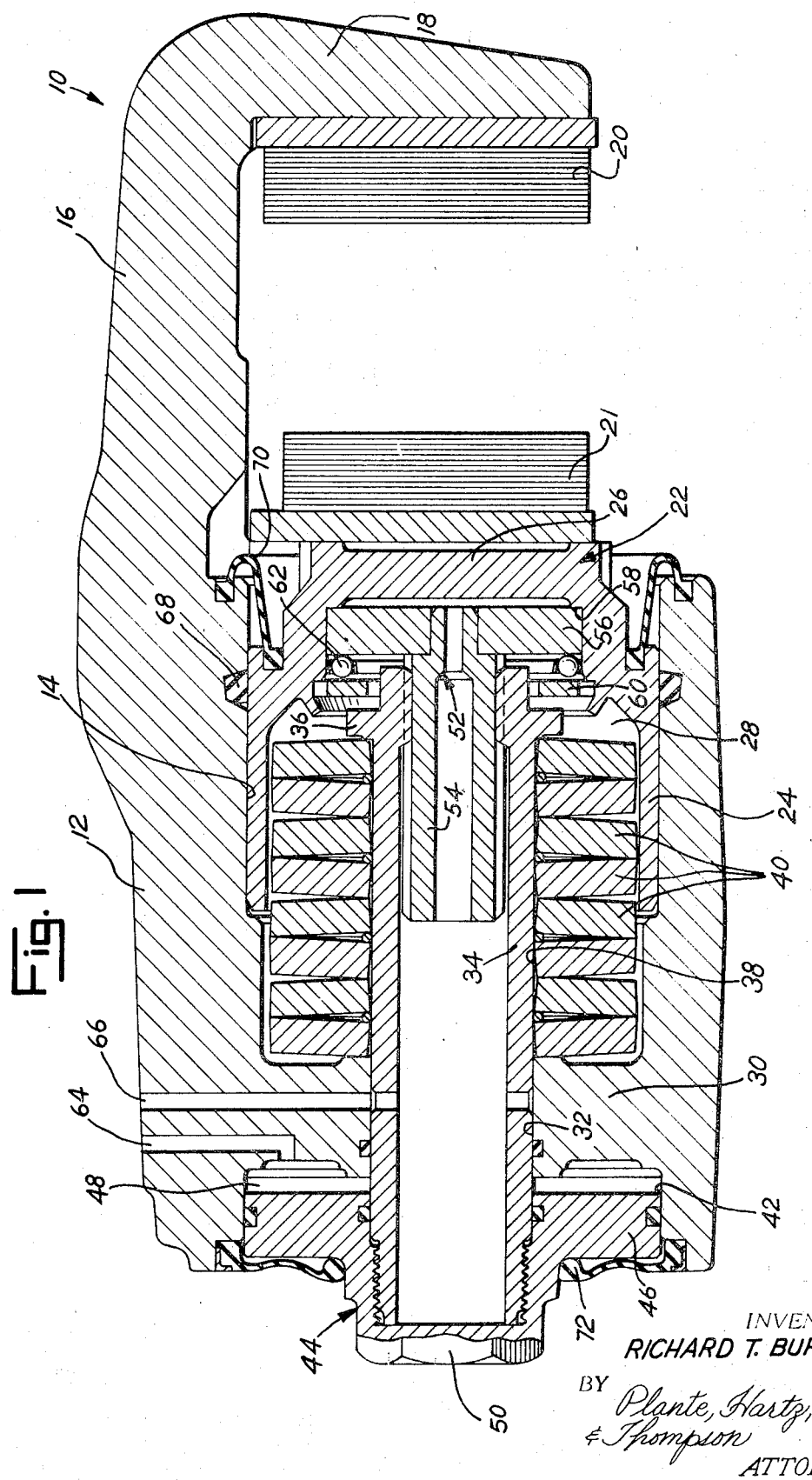

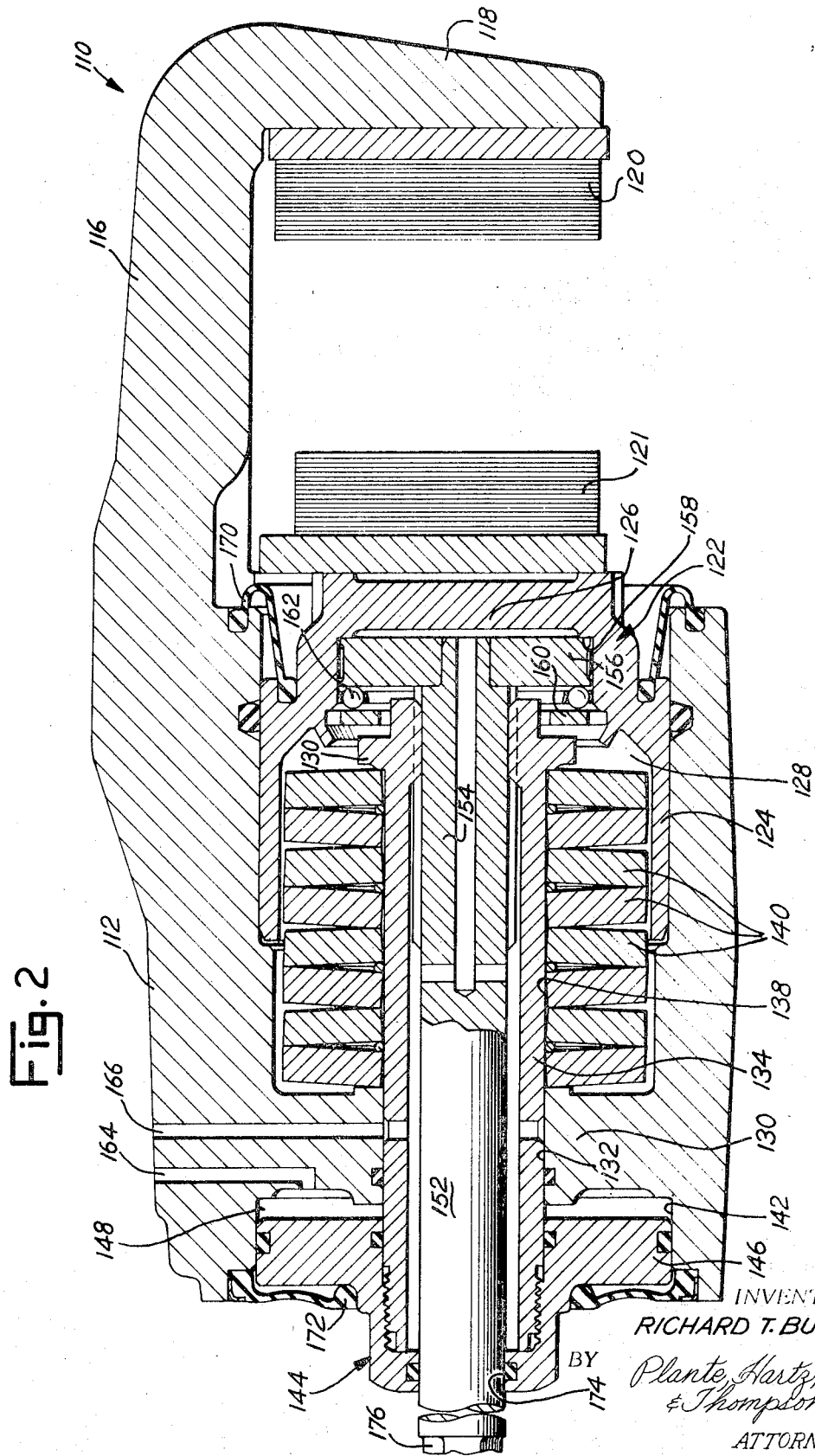

3,647,030

1

SPRING-APPLIED DISC BRAKE

BACKGROUND OF THE INVENTION

This invention relates to a disc brake having a spring actuator in addition to the usual hydraulic actuator.

In order to provide "fail safe" braking for vehicles equipped with disc brakes, it is necessary to provide a spring actuator, in addition to the usual hydraulic actuator, that automatically applies the vehicle's brakes when a malfunction occurs in the vehicle hydraulic system. If desired, a valve can be provided to release the hydraulic pressure opposing the spring actuator so that the spring actuator can also serve as a parking brake.

A spring brake and vehicle hydraulic system of the type described above are disclosed in copending application Ser. No. 797,530, filed Feb. 7, 1969, owned by the assignee of the present invention and incorporated herein by reference. Although the device disclosed in the aforementioned application has been quite successful, it is desirable to provide a spring-applied disc brake that is smaller and lighter than the one disclosed in the aforementioned application. It is also desirable to provide a way to release the spring actuator so that the vehicle may be moved to a place where repairs may conveniently be made.

SUMMARY OF THE INVENTION

Therefore, an important object of my invention is to provide a disc brake having both a hydraulic actuator and a spring actuator that is substantially smaller than those known in the prior art.

Another important object of my invention is to provide a mechanism to relieve the actuating force applied by the spring actuator after a malfunction in the vehicle's hydraulic system so that the vehicle may be moved to a more convenient location for repair.

DESCRIPTION OF THE DRAWING

FIG. 1 is a longitudinal cross-sectional view of a disc brake made pursuant to the teachings of my present invention; and FIG. 2 is a longitudinal, cross-sectional view of an alternate embodiment of my invention.

DETAILED DESCRIPTION

Referring now to FIG. 1 of the drawings, a disc brake actuator generally indicated at 10 includes a housing 12 that defines a bore 14 therewithin. The housing 12 further includes a bridge piece 16 that extends across the periphery of the rotor (not shown) and a radially inwardly extending portion 18. A friction element 20 is mounted on the portion 18. Another friction element 21 is operably connected to a piston 22 that is slidable in the bore 14. Of course, when the brake is installed on a vehicle, the entire housing 12 is slidably mounted on a torque member (not shown) secured to a fixed part of the vehicle in the manner more fully described in U.S. Pat. No. 3,388,774, owned by the assignee of the present invention and incorporated herein by reference.

The piston 22 includes an annular wall 24 that slidably engages the wall of the bore 14 and a closed end 26 that engages the friction element 20. The end 26 and wall 24 cooperate to define a chamber 28 within the piston. The housing 12 includes a radially inwardly extending annular partition 30 having an opening 32 extending therethrough. An elongated member 34 is slidably and rotatably supported by the annular partition 30 and extends into the bore 14. The member 34 includes a circumferentially extending, radially projecting lip 36 on one end thereof. The member 34 extends through the central openings 38 in a plurality of annular, resilient conical washers 40 disposed between the lip 36 and the partition 30. The washers 40 are of the type more fully disclosed in the aforementioned application No. 797,530. It should be noted that at least a portion of the washers 40 are housed within the chamber 28 to minimize the size of the housing.

2

An open-ended bore 42 is provided in the housing 12 on the opposite side of the partition 30 from the bore 14. The elongated member 34 extends through the opening 32 and into the bore 42. A cap 44 is secured to the end of the member 34 and includes an annular, radially extending pistonlike portion 46 that slidably and sealingly engages the wall of the bore 42. The pistonlike portion 46 cooperates with the wall of the bore 42 and the outer surface of the partition 30 to define a variable volume chamber 48 therebetween. The cap 44 also includes a portion 50 in the form of a hexhead nut adapted to receive an appropriate tool so that the member 34 may be rotated.

An abutment member or automatic adjuster 52 includes an axially extending portion 54 having threads on its outer diameter engaging threads on the inner diameter of the member 34 so that relative rotation between the members 34 and 52 extends the member 52 from the member 34 or retracts member 52 into the member 34, depending upon the direction of rotation. The member 52 further includes a radially extending abutment portion 56 that is adapted to engage the end wall 26 of the piston 22 at the bearing surface 58. The threads interconnecting the members 52 and 34 are of the type that permit the member 52 to rotate relative to the member 34 when an axially directed force acting to the right viewing FIG. 1 is applied to member 52, but which lock to prevent relative rotation when a similar force acting to the left is applied. The firstnamed force is applied to the member 52 by a washer 60 secured to the piston 22 and acting through a bearing 62 to permit the member 52 to rotate freely. Therefore, as the applying stroke of the piston 22 increases due to wear of the friction elements 20, 21, the piston 22 will also advance the member 52 to the right viewing FIG. 1. Since the piston can retract only until the bearing surface 58 engages the member 52, retraction of the piston is limited to a substantially constant distance independently of wear of the friction elements. Details of the construction and operation of the automatic adjuster member 52 are more completely described in copending U.S. Pat. application Ser. No. 863,481 filed Oct. 3, 1969, owned by the assignee of the present invention and incorporated herein by reference.

A fluid inlet port 64 is provided to communicate pressurized fluid into the chamber 48. Another inlet port 66 is provided to communicate fluid to the chamber 28 through the members 34 and 52 to urge the piston 22 to the right viewing FIG. 1. Ports 64 and 66 are connected with an appropriate vehicle hydraulic system, such as that disclosed in the aforementioned U.S. Pat. application No. 797,530. A seal 68 is provided to prevent fluid from escaping from the chamber 28 and to also retract the piston 22 when the vehicle operator releases the brake as is more completely described in my U.S. Pat. No. 3,377,076, owned by the assignee of the present invention and incorporated herein by reference. Flexible boots 70, 72 are provided to prevent contaminants from entering the chambers 28 and 48, respectively.

MODE OF OPERATION

When the vehicle operator starts the vehicle's engine, fluid is admitted into the chamber 48 and acts against the piston 46 to urge the latter to the left, viewing FIG. 1. Since the cap 44 is fastened securely to the member 34, members 34 and 52 are also moved to the left, compressing the spring discs 40. When the discs 40 are compressed, the piston 22 is able to move to the right, viewing FIG. 1, to urge the friction elements 20, 21 into engagement with the rotor (not shown) in response to admission of fluid pressure into the chamber 28 after the vehicle operator depresses the usual brake pedal mounted in the vehicle operator's compartment. If the piston 22 moves a distance sufficient to cause the washer 60 to apply a force on the member 52 when the brake is applied, the member 52 rotates relative to the member 34, extending from the latter as described above.

If a malfunction in the vehicle's hydraulic system reduces the pressure level in the chamber 48 by more than a predetermined amount, the resilient washers 40 release to urge the member 34 to the right, viewing FIG. 1.

As the member 34 is urged to the right, portion 56 of the adjuster member 52 is brought into engagement with the bearing surface 58 on piston 22. Further movement of the members 34 and 52 urges the piston 22 to the right, viewing FIG. 1, to drive the friction elements into frictional engagement with the rotor, not shown. In this condition, the vehicle's brakes are "locked on" and the vehicle cannot be moved. However, since the vehicle might experience a hydraulic failure while disposed in an inconvenient location, it is desirable to provide a mechanism to release the vehicle's brakes. This is accomplished by using an appropriate tool on the hex nut 50 to rotate the member 34. Since the frictional engagement between the bearing surface 58 on piston 22 with the portion 56 of adjuster member 52 keeps the latter from turning, if the elongated member 34 is rotated in the proper direction, the adjuster member 52 will be retracted into the member 34 a distance sufficient to permit rotation of the vehicle's wheels.

DESCRIPTION OF THE ALTERNATE EMBODIMENT

In the embodiment of FIG. 2, elements substantially the same as those in the preferred embodiment retain the same reference character appended with the numeral 1. The construction of the FIG. 2 embodiment is identical to the brake illustrated in FIG. 1, except that the end cap 144 is provided with an opening 174 extending therethrough which is substantially coaxial with the elongated member 134. Axially extending portion 154 of the adjuster member 152 is lengthened so that it extends through the opening 174 and terminates in a hex nut 176. When a malfunction has resulted in the friction elements 20, 21 being driven into engagement with the rotor (not shown) by the spring washers 140, the brake may be released by using an appropriate tool on the nut 176 to rotate the member 152. As the member 152 is rotated, portion 156 is moved away from the bearing surfaces 158 on the piston 122, permitting the latter to retract. The braking pressure exerted on the friction elements is thereby relieved, permitting the vehicle to be moved.

I claim:

1. In a disc brake having a rotor and a pair of friction elements disposed on opposite sides of the rotor:
a housing defining a bore therewithin;
a first piston slidable in said bore engaging one of said friction elements;
resilient means housed within said chamber; and
force-transmitting means slidably mounted in said bore operably connected to said resilient means and to said piston;
said force-transmitting means being shiftable from a first condition opposing the bias of the resilient means to permit movement of the piston toward and away from the rotor to a second condition in which the resilient means urges the piston toward the rotor whereby the friction elements are urged into frictional engagement with said rotor;
said force-transmitting means including an elongated member slidably mounted in said housing; and
an abutment member on said elongated member for engagement with the said piston for limiting retraction of the latter when said force transmitting means is disposed in said first condition;
said abutment member being threadedly connected to said elongated member for axial movement relative thereto upon relative rotation between the members;
one of said members projecting from said housing to permit rotation of said one member when said force-transmitting means is disposed in said second condition to move said abutment member away from the rotor to relieve the force applied to said piston by said resilient means.

2. The invention of claim 1:
said one member being said elongated member.

3. The invention of claim 1:
said one member being said abutment member.

4. In a disc brake having a rotor and a pair of friction elements disposed on opposite sides of the rotor:
a housing defining a bore therewithin;
a first piston slidable in said bore engaging one of said friction elements;
resilient means housed within said chamber; and
force transmitting means slidably mounted in said bore operably connected to said resilient means and to said piston;
said force-transmitting means being shiftable from a first condition opposing the bias of the resilient means to permit movement of the piston toward and away from the rotor to a second condition in which the resilient means urges the piston toward the rotor whereby the friction elements are urged into frictional engagement with said rotor;
said resilient means being a plurality of annular conical disc washers;
said force-transmitting member including an elongated annular member extending through the opening in said washers and an abutment member for engagement with said closed end of said first piston and threadedly received within said elongated member for axial movement relative thereto upon relative rotation between the members;
one of said members projecting from said housing to permit rotation of said one member when said force-transmitting means is disposed in said second condition to move said abutment members away from said piston to relieve the force applied to the latter by said resilient means.

5. In a disc brake having a rotor and a pair of friction elements disposed on opposite sides of the rotor:
a housing defining a bore therewithin;
a piston slidable in said bore for urging said friction elements into frictional engagement with said rotor;
resilient means operably connected to said piston and shiftable from a first condition permitting movement of the piston toward and away from the rotor to a second condition in which the piston is urged into a position maintaining said friction elements in engagement with the rotor; and
a retractable element operably connecting the piston and the resilient means to relieve the force exerted on the piston by the resilient means upon retraction of said retractable element when said resilient means is disposed in said second position;
said retractable element including a pair of members movable axially with respect to one another upon relative rotation between the members;
one of said members extending from said housing to permit manual rotation of said one member.

6. The invention of claim 5:
said one member being an elongated member slidably supported in said housing, said other member being an abutment member operably connected to said elongated member for axial movement relative to the latter upon said relative rotation of the members;
said piston engaging said abutment member when the resilient means is disposed in said second condition before said element is retracted.

7. The invention of claim 5:
said other member being an elongated member slidably supported in said housing, said one member being an abutment member operably connected with said elongated member for axial movement relative to the latter upon said relative rotation between the members;
said piston engaging said abutment member when the resilient means is disposed in said second condition before said element is retracted.

* * * * *